United States Patent

[11] 3,616,236

[72] Inventor Per Staffan Delin
Södertälje, Sweden
[21] Appl. No. 739,217
[22] Filed June 24, 1968
[45] Patented Oct. 26, 1971
[73] Assignee Aktiebolaget Astra

[54] PRODUCTION OF RHIZOBIUM STRAINS RESISTANT TO DRYING
9 Claims, No Drawings

[52] U.S. Cl. ..................................... 195/79,
47/58, 195/96
[51] Int. Cl. ..................................... C12k 1/02
[50] Field of Search ............................ 195/96, 76,
77, 79, 50, 59, 72, 75; 71/7; 47/58

[56] References Cited
UNITED STATES PATENTS

| | | | |
|---|---|---|---|
| 3,075,887 | 1/1963 | Silliker et al. | 195/101 |
| 3,168,796 | 2/1965 | Scott et al. | 47/1 |
| 3,239,427 | 3/1966 | Huang et al. | 195/36 |
| 3,255,095 | 6/1966 | Ricard | 195/103.5 |

*Primary Examiner*—A. Louis Monacell
*Assistant Examiner*—Seymour Rand
*Attorney*—Brumbaugh, Free, Graves & Donohue ABSTRACT: The production of Rhizobium strains having good infecting and nitrogen-fixing characteristics by cultivating the strain, then subjecting it to drying whereby those strains which are sensitive to drying are destroyed and those strains which are resistant to drying survive. The surviving strains are then recultivated and subjected to at least one more drying treatment.

PRODUCTION OF RHIZOBIUM STRAINS RESISTANT TO DRYING

This invention relates to strains of earth living bacteria of the Rhizobium family which are resistant to drought and suitable for inoculation of leguminous seeds.

These bacteria, which live freely in the soil, can infect the roots of leguminous plants, i.e., plants belonging to the family Leguminosae. This causes nodules to be formed on the roots of the leguminous plants, which under suitable conditions can fix the nitrogen of the air and convert it into an organically bound form. This nitrogen fixation is used in agriculture for legume production of protein, and as a soil-improving agent.

The purpose of the invention is to provide Rhizobium strains being so resistant as to give bacteria from the strains, which after inoculation can be maintained living on the seed for a longer period of time than normally even under exerting conditions, such as heat and drought. It is also a purpose to obtain such bacterial strains that the inoculation can be carried out in good time before the sowing, suitably centrally at the seedsman's shop. Then, the seed can be distributed to the farmers ready for sowing.

It is known that all Rhizobium strains do not give nitrogen fixing symbioses with all leguminous plants, but that the nitrogen fixing ability is dependent both on the plant in question and the bacteria. There exist different so-called inoculation groups, which means that a Rhizobium species usually forms a nitrogen fixing symbiosis with only one or a few nearly related Leguminosae. For instance, *Rhizobium trifoli* gives on efficient nitrogen fixation with trefoil but not with peas and vetches, and *Rhizobium leguminosarum* gives an efficient nitrogen fixation with peas and beans but not with trefoil. By inoculating a leguminous seed with a suitable Rhizobium species it is possible to provide for an infection of the roots with suitable Rhizobium bacteria when the roots germinate from the seeds, and so to promote the formation of nodules and the fixation of nitrogen.

Hitherto, the procedure has usually been carried out by suspending a soil or pest culture of the Rhizobia in question in water, and moistening the seed with this suspension immediately before sowing, the procedure being carried out by the farmer himself. Nor only is this procedure time consuming and troublesome, but the result has not always been as good as expected. This has been found to be because most of the bacteria die if the treated seed reaches a dry condition before it is buried into the soil, or if the soil is too dry. The weather at the moment of sowing is also of importance, as dry and hot weather promotes damage to the bacteria on the seed. It is an object of the present invention to mitigate this disadvantage of the known process.

The invention is based on the discovery that within a population of Rhizobium bacteria there is a certain variation of the ability to resist dry and hot conditions, and that this variation depends on the fact that the bacteria are not uniform but appear as different strains with different resistances.

It has now been found that a selection of active resistant Rhizobium strains can be obtained in a simple manner, which strains maintain their infecting and nitrogen fixing ability for a considerable period of time.

The method according to the present invention is essentially characterized in that a normal or natural culture of the Rhizobium of the desired inoculation group—which will include a number of strains with different resistances—and having a good infecting and nitrogen fixing ability is cultivated on a Rhizobium substrate in a manner known per se and then classified by subjecting it to a drying procedure, optionally with heating, so that bacterial strains sensitive to drought and heat are killed, the dried product, wherein the weak strains have died, being recultivated so allowing survivors to reproduce; the procedure can be repeated one or more times, if desired or necessary, to produce a final product consisting of strains that are resistant in a particular desired extent. Preferably at least 90 percent of the bacteria are killed in the course of each drying treatment.

The drying treatment can be carried out by transferring the bacteria on a drying agent, having for instance a hygroscopic character, such as silica gel, or by enclosing them in a zone containing such an agent. Other conventional drying procedures may also be used, for instance treatment with a suitable, optionally heated, gas or gas mixture, or vacuum drying or spray drying. Heat radiation alone or in combination with another method can be used if desired. It is possible also to use radiation with ultraviolet light so as to obtain strains that are more resistant to solar radiation. The drying process can be accelerated by increasing the temperature, but suitably not above about 95° C.

The invention will be more closely described in the following examples.

A number of Rhizobium strains from different inoculation groups, all having shown a good infecting and nitrogen fixing ability in association with the plants indicated, were separately grown on Rhizobium substrates according to Dorn (Zentralblatt fur Bakteriologie 109, 120, 1956). The strains were then smeared out under aseptic conditions on one side of semipermeable membranes, which were then placed with the smeared side upwards on the same substrate to which 2 percent agar-agar had been added to give solidity. After 3–5 days at 28° C., when the bacteria had grown properly, the membranes with their appendant bacterial mass were transferred to preparation tubes half-filled with dry blue gel (silica gel with moisture indicator) under aseptic conditions, in which tubes the bacteria were allowed to dry for two days at 28° C., the temperature being then increased to 70° C., where it was maintained for 7 days. The membranes with the bacteria were then again placed on agar plates with Dorn's substrate, the bacteria surviving the treatment growing out and forming colonies. These were used as mother cultures for material to be used for inoculating leguminous seed in the comparative tests described below. It is, of course, possible to repeat the procedure, and the time as well as the temperature of the treatment can be varied, the best conditions to use varying with the resistance of the starting bacterial material and the desired resistance of the final material.

By this selection procedure resistant strains have been obtained, which have been compared with untreated strains as follows: The bacteria were suspended and diluted by powers of ten under aseptic conditions with water containing suitable amounts of inert adhesive, in this case Bentonite (R) or Modocol (R). These suspensions were then tested on seeds, and also in the laboratory on glass beads having a diameter of 2 millimeters. The adhesive ensured that the bacteria adhered to the seeds and the glass beads respectively. (The glass beads were used when making quantitative measurements of the rate of kill under laboratory conditions, and the seeds when investigating the formation of nodules and nitrogen fixation.)

Tests on glass beads gave the following results.

The time for killing to 99 percent of different Rhizobium strains given in the table below was determined for the untreated starting material and for the selected strain by drying at 70° C. for 7 days. Suspensions of the individual bacterial cultures were transferred onto 2 mm. glass beads under aseptic conditions and were allowed to dry and then stand at 28° C. and 50–70 percent relative humidity. Several suspensions of different dilutions were made of each strain investigated, since the starting cultures were much too concentrated, containing hundreds of millions of cells per milliliter. The starting culture was diluted by powers of ten and it was found to be suitable to use the dilutions $10^5, 10^6, 10^7$ and $10^8$, containing respectively an estimated number of 10,000, 1,000, 100 and 10 cells per milliliter. Four suspensions were made of each culture, untreated as well as classified, i.e., a total of 8 suspensions per Rhizobium culture investigated. 2.0 milliliters of each suspension was distributed over .70 g., about 3,500 pieces, of glass beads in a 500 milliliters Erlenmeyer flask, which flask during the testing period of more than two months was allowed to stand at 28° C. and 50–70 percent humidity. Immediately and subsequently at intervals of 7–10 days samples of about 100 glass beads were taken from each preparation. The number of living cells in each sample was determined by a viable count technique. (See for instance R. Y. Stanier, M. Doudoroff and E. A. Adelberg, General Microbiology, MacMillan & Co., London 1958.)

The glass beads in the sample were shaken with 5 milliliters of water under aseptic conditions for half an hour, the cells loosening from the glass beads and passing to the water phase. Known fractions of this 5 milliliters water phase were then distributed on the surface of culture agar plates, the individual cells being allowed to grow out to visible colonies on the plates. From the number of colonies on the plates, the number of glass beads of the sample and the fraction of the sample distributed per plate, the number of living bacteria per glass bead of the sample was calculated from the formula:

$$n = M/(a \cdot b)$$

wherein $n$ = the number of living bacteria per glass bead of the sample
$M$ = the number of colonies per plate
$a$ = the number of glass beads of the sample
$b$ = the fraction of the 5 milliliters water phase distributed on the plate.

The test conditions were chosen so that $M$ lies between 10 and 200; $a$ is of the order of 100, and $b$ is 0.1, 0.01, 0.001 or 0.0001. By determining $n$ immediately after the treatment of the glass beads with the bacterial suspensions in this manner a starting value $n_0$ was obtained for the different cultures. Repeated determinations of $n$ were then made at intervals of 7 to 10 days. As the bacteria successively die on the glass beads it is to be expected that after a certain period of time $n$ becomes $= 0.01 \, n_0$. This means that 1 percent of the cells living at the time $O$ are still alive, or that 99 percent of the bacteria have been killed. The longer it takes to reach such a degree of killing the more resistant is the strain. Table 1, wherein the periods of times for killing to 99 percent are given in days for different strains, shows that the selected strains are much more resistant than and superior to the starting strains, except for the lucerne strain which had a high resistance from the beginning.

TABLE 1

|  | Starting strain | Selected strain |
|---|---|---|
| Rh. japonicum (Soya strain) | <8 | >55 |
| Rh. meliloti (lucerne strain) | >65 | >65 |
| Rh. trifoli (trefoil strain) | <20 | >65 |
| Rh. Leguminosarum (peasvetches strain) | <8 | >55 |
| Rh. phaseoli (bean strain) | <8 | >46 |
| Rh. lupini (lupin strain) | <7 | >22 |

Comparative cultivation tests on seeds were carried out in the following way.

Strains from three Rhizobium species, *Rhizobium trifoli*, Rh. meliloti and *Rh. leguminosarum*, were investigated as untreated starting strains Rt, Rm and Rl, respectively, as well as selected by drying for 7 days at 70° C., Rt 7, Rm 7 and Rl 7, respectively. Seeds were inoculated with a diluted suspension of bacteria of the respective strains, and from the dry seeds a certain number were placed to grow after different periods of time. At each such occasion samples were taken for estimating the number of bacteria per seed. The number of the grown plants showing nodules was recorded. Table 2 shows results from six such experiments. The left hand column for each experiment gives the number of viable bacteria per seed at different times after inoculation; the corresponding right hand columns give the number of plants out of 10 which showed effective nodulation.

The results show that it is possible, by selection according to the invention, to obtain formation of nodules when sowing a considerably longer time after inoculation than with the corresponding unselected material.

In the foregoing, silica gel has been described as a suitable drying agent. Other suitable drying agents include about 10 to about 30 percent by weight of dehydrated calcium sulfate, or about 10 to about 30 percent of bentonite.

According to one preferred embodiment of the invention the stepwise drying operation described herein is repeated until at least about 90 percent of the bacteria present survive a drying operation carried out at about 28° C. Preferably, the final dry preparation contains about $10^6$ to $10^{10}$ viable bacteria per gram.

TABLE 2

| Days after inoculation | Numbers of bacteria per seed | Plants with nodules per 10 plants | Number of bacteria per seed | Plants with nodules per 10 plants |
|---|---|---|---|---|
| Seeds of *trifolium pratense*, trefoil | | | | |
| | Rt | | Rt 7 | |
| 1 | 8×10⁴ | 9 | 2×10⁵ | 10 |
| 10 | 0 | 0 | 1×10⁵ | 10 |
| 20 | — | 0 | 8×10⁴ | 9 |
| 30 | | | 7×10⁴ | 10 |
| 40 | | | 6×10⁴ | 9 |
| 90 | | | — | 8 |
| Seeds of *medicago sativa*, lucerne | | | | |
| | Rm | | Rm 7 | |
| 1 | 5×10⁴ | 10 | 4×10⁴ | 10 |
| 10 | 2×10² | 6 | 9×10³ | 10 |
| 20 | 0 | 0 | 2×10³ | 10 |
| 30 | — | 0 | 7×10² | 10 |
| 40 | | | 3×10² | 8 |
| 90 | | | — | 7 |
| Seeds of *pisum sativum*, pea | | | | |
| | Rl | | Rl 7 | |
| 1 | 2×10⁵ | 10 | 5×10⁴ | 9 |
| 10 | 4×10⁴ | 2 | 2×10⁴ | 10 |
| 20 | 5×10³ | 0 | 2×10⁴ | 10 |
| 30 | — | 0 | 1×10⁴ | 8 |
| 40 | | | 8×10³ | 7 |
| 90 | | | — | 5 |

What we claim is:

1. A process for the preparation of a bacteria preparation intended for inoculation of leguminous seed, which preparation contains resistant bacteria strains of Rhizobium, which strains have good infecting and nitrogen-fixing abilities in symbiosis with plants of the leguminosea family, characterized in that a culture of Rhizobium bacteria of selected strain and inoculation group having good infecting and nitrogen-fixing abilities is cultivated on a Rhizobium-substrate and thereafter is subjected to a drying treatment at a temperature of at most 95° C., whereby bacteria strains sensitive to drying are killed, whereafter the residual drying-resistant cells are subjected to at least one additional cultivation and drying treatment of the type above described whereby the culture is multiplied by recultivating it.

2. Method according to claim 1, wherein at least 90 percent of the bacteria in the culture are killed in the course of the drying treatment.

3. Method according to claim 1, wherein the drying and cultivation sequence is repeated until at least about 90 percent of the bacteria present survive a drying operation carried out at about 28° C.

4. Method according to claim 1, wherein the culture is dried by keeping it in a closed zone in the presence of a drying agent.

5. Method according to claim 4, wherein the drying and cultivation sequence is repeated until at least about 90 percent of the bacteria present survive a drying operation carried out at about 28° C.

6. Method according to claim 4, wherein the drying agent is silica gel.

7. Method according to claim 4, wherein the drying agent is dehydrated calcium sulfate.

8. Method according to claim 4, wherein the drying agent is bentonite.

9. Method according to claim 1, wherein during the drying treatment the culture is exposed to ultraviolet irradiation whereby bacteria strains which are sensitive to ultraviolet irradiation are destroyed to provide residual drying-resistant strains which are resistant also to ultraviolet irradiation.

* * * * *

PO-1050
(5/69)

UNITED STATES PATENT OFFICE
CERTIFICATE OF CORRECTION

Patent No. 3,616,236        Dated October 26, 1971

Inventor(s) Per Staffan Delin

It is certified that error appears in the above-identified patent and that said Letters Patent are hereby corrected as shown below:

| In the Patent: | In the File History: |
|---|---|
| Col. 1, line 30, "on" should read --an--; | Page 2, line 25 |
| Col. 3, line 29, "valve" should read --value--; | Page 6, line 27 |
| Col. 3, line 33, after "that" insert --only--; | Page 7, line 3 |
| Col. 4, line 35, "$4 \times 10^4$" should be --$7 \times 10^4$--. | Page 9, midway |

Signed and sealed this 18th day of April 1972.

(SEAL)
Attest:

EDWARD M. FLETCHER, JR.
Attesting Officer

ROBERT GOTTSCHALK
Commissioner of Patents